(12) United States Patent
Ishihara et al.

(10) Patent No.: US 8,725,356 B2
(45) Date of Patent: May 13, 2014

(54) VEHICLE STEERING CONTROL SYSTEM

(71) Applicant: JTEKT Corporation, Osaka (JP)

(72) Inventors: Atsushi Ishihara, Sakurai (JP); Takeshi Watanabe, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/790,953

(22) Filed: Mar. 8, 2013

(65) Prior Publication Data
US 2013/0245891 A1 Sep. 19, 2013

(30) Foreign Application Priority Data

Mar. 15, 2012 (JP) ................................. 2012-059289

(51) Int. Cl.
*B62D 5/04* (2006.01)
*G06F 19/00* (2011.01)
(52) U.S. Cl.
USPC ................................ 701/42; 701/41; 180/446

(58) Field of Classification Search
USPC ........ 701/42, 41; 180/446, 402, 444; 318/632
See application file for complete search history.

(56) References Cited

U.S. PATENT DOCUMENTS

| 5,236,335 | A  | * | 8/1993 | Takeuchi et al. | 180/446 |
| 6,389,342 | B1 | * | 5/2002 | Kanda | 701/41 |
| 2008/0114515 | A1 | * | 5/2008 | Hara | 701/42 |

FOREIGN PATENT DOCUMENTS

JP A-2006-182058 7/2006

\* cited by examiner

*Primary Examiner* — Tan Q Nguyen
(74) *Attorney, Agent, or Firm* — Oliff PLC

(57) ABSTRACT

The absolute value of a steering torque detected by a steering torque sensor is compared with a predetermined threshold. When the absolute value of the detected steering torque is smaller than the threshold, a steering reaction force is controlled on the basis of the steering torque; whereas, when the absolute value of the detected steering torque is larger than or equal to the threshold, the steering reaction force is controlled using a detected reaction motor current value as a reference value.

3 Claims, 3 Drawing Sheets

VEHICLE STEERING CONTROL SYSTEM

INCORPORATION BY REFERENCE/RELATED APPLICATION

This application claims priority to Japanese Patent Application No. 2012-059289 filed on Mar. 15, 2012 the disclosure of which, including the specification, drawings and abstract, is incorporated herein by reference in its entirety.

BACKGROUND OF THE INVENTION

1. Field of the Invention

The invention relates to a vehicle steering control system that steers steered wheels on the basis of an operation of a steering member.

2. Discussion of Background

In recent years, there has been proposed a vehicle steering control system equipped with a so-called steer-by-wire system in which a steering member, such as a steering wheel, and steered wheels are not mechanically coupled to each other and part of a steering transmission system is formed of an electrical path. Such a vehicle steering control system includes a steering mechanism that is connected to a steering member and a steered mechanism that actually steers tires with the use of a steered system motor used to steer the steered wheels. The steered mechanism executes drive control on the steered system motor on the basis of a steering angle of the steering member, which is detected by a steering angle sensor.

The steering mechanism includes a reaction motor coupled to a steering shaft, simulates reaction force that is transmitted from a road surface, or the like, to the steered wheels with the use of the reaction motor, and applies the simulated reaction force to the steering member as steering reaction force (see Japanese Patent Application Publication No. 2006-182058 (JP 2006-182058 A)). As methods of controlling the reaction motor, there are a method (A) in which a motor current that is supplied to the reaction motor is directly controlled and a method (B) in which a steering torque that is applied to the steering member is detected with the use of a steering torque sensor and feedback control is executed such that the steering torque approaches a target torque. The method (B) is more accurate than the method (A), and is generally used. A steering torque sensor for an electric power steering is used as the steering torque sensor.

In the steer-by-wire system, a feel that the steering member is rotated to the steering end is also created by the reaction motor. Therefore, large steering torque is applied to the steering member. However, there is a limit on a detection range of the steering torque sensor. Therefore, in order to broaden the detection range of the steering torque sensor, a torsion bar having a large spring constant may be employed as a torsion bar that is a component of the steering torque sensor. However, this may reduce the detection resolution of the sensor within a range in which a steering torque is small.

SUMMARY OF THE INVENTION

The invention provides a vehicle steering control system that is able to cope with a steering torque that falls outside the detection range of a steering torque sensor.

According to a feature of an example of the invention, the absolute value of a steering torque detected by a steering torque sensor is compared with a predetermined threshold, a steering reaction force is controlled on the basis of the steering torque when the absolute value of the detected steering torque is smaller than the threshold; whereas the steering reaction force is controlled using a detected reaction motor current value as a reference value when the absolute value of the detected steering torque is larger than or equal to the threshold.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
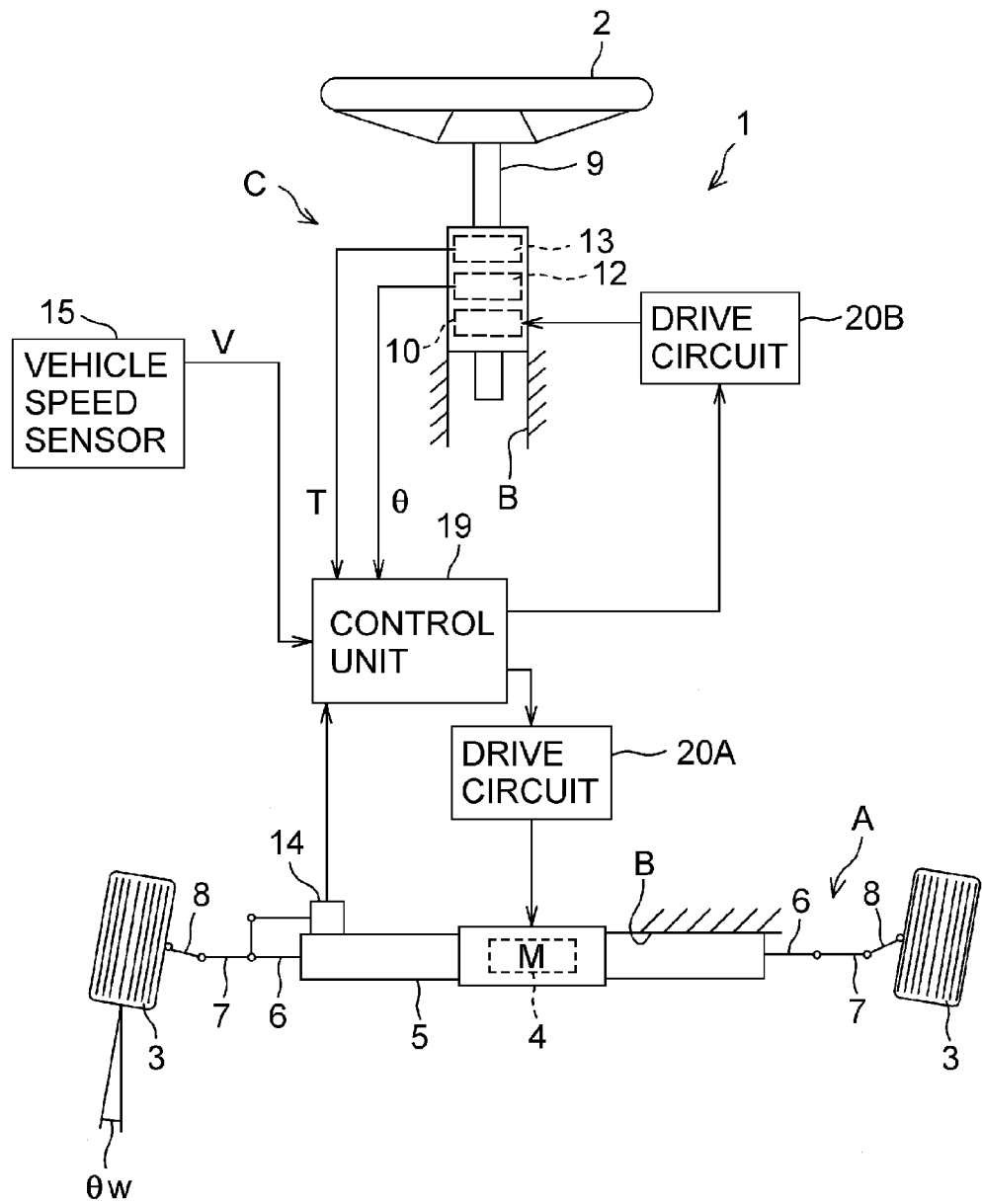
FIG. 1 is a schematic view that shows the schematic configuration of a vehicle steering control system according to an embodiment of the invention.

FIG. 1 is a schematic view that shows the schematic configuration of a vehicle steering control system 1 according to an embodiment of the invention. As shown in FIG. 1, the vehicle steering control system 1 constitutes a so-called steer-by-wire system in which a steering member 2, such as a steering wheel, is not mechanically coupled to steered wheels 3.

In the vehicle steering control system 1, an operation of a steered system actuator 4 that is driven in response to a rotating operation of the steering member 2 is converted into a linear motion of a steered shaft 6 in the vehicle width direction. The steered shaft 6 is supported by a housing 5. The linear motion of the steered shaft 6 is converted into a steered motion of the right and left steered wheels 3. As a result, a vehicle is steered. The position of the steering member 2, which corresponds to the position of the steered wheels 3 at the time when the vehicle is travelling straight ahead, is set as a steering neutral position.

The steered system actuator 4 includes, for example, a steered system motor M. The driving force of the steered system motor M (the rotational force of an output shaft) is converted into an axial linear motion of the steered shaft 6 by a ball screw mechanism provided for the steered shaft 6. The linear motion of the steered shaft 6 is transmitted to tie rods 7 coupled to respective ends of the steered shaft 6, and causes knuckle arms 8 to pivot. As a result, the steered wheels 3 supported by the knuckle arms 8 are steered.

The steered shaft 6, the tie rods 7 and the knuckle arms 8 constitute a steered mechanism A that steers the steered wheels 3. The housing 5 that supports the steered shaft 6 is fixed to a vehicle body B. The steering member 2 is coupled to a steering shaft 9 rotatably supported by the vehicle body B. A reaction motor 10 is fitted to the steering shaft 9. The reaction motor 10 is used to apply reaction force, which is transmitted from a road surface, or the like, to the steered wheels 3, to the steering member 2 as steering reaction force. The reaction motor 10 includes a motor, such as a brushless motor. The reaction motor 10 is accommodated in a housing fixed to the vehicle body B.

The vehicle steering control system 1 includes a steering angle sensor 12 on the steering shaft 9. The steering angle sensor 12 is used to detect a steering angle θ of the steering member 2. A torque sensor 13 is provided on the steering shaft 9. The torque sensor 13 is used to detect a steering torque T applied to the steering member 2. The steering angle θ increases in a positive direction as the steering member 2 is rotated to the right from the neutral position, and the steering angle θ increases in a negative direction as the steering member 2 is rotated to the left from the neutral position. The sign of the steering torque T when the steering member 2 is rotated to the right is a positive sign, whereas the sign of the steering torque T when the steering member 2 is rotated to the left is a negative sign. The steering member 2, the steering shaft 9 and the steering angle sensor 12 constitute a steering mechanism C.

The vehicle steering control system 1 includes a steered angle sensor 14 for the steered shaft 6. The steered angle sensor 14 is used to detect a steered angle of the steered wheels 3. Other than these sensors, a vehicle speed sensor 15 that detects a vehicle speed V is provided. The vehicle speed V may be detected on the basis of a vehicle speed signal that is acquired through an in-vehicle LAN (CAN) without providing the vehicle speed sensor 15.

Detection signals from the sensors 12 to 15 are input into a control unit 19 that serves as a control unit that is an electronic control unit including a microcomputer. The control unit 19 executes drive control on the steered system motor M through a drive circuit 20A, and executes drive control on the reaction motor 10 through a drive circuit 20B.

Figure 2:
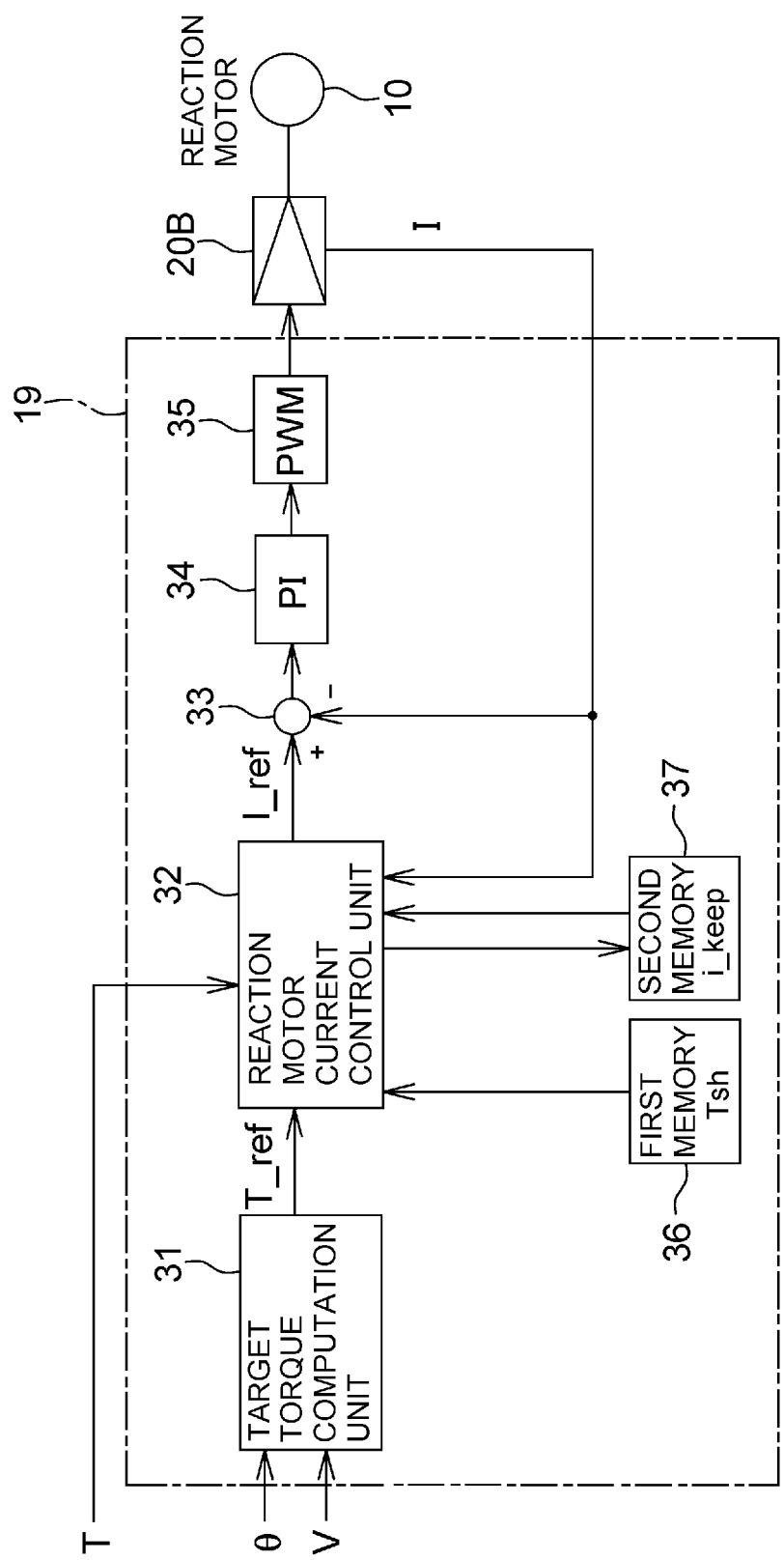
FIG. 2 is a functional block diagram that shows sections of a control unit, for executing drive control on a reaction motor.

FIG. 2 is a functional block diagram that shows sections of the control unit 19, for executing drive control on the reaction motor 10. The control unit 19 includes a target torque computation unit 31, a reaction motor current control unit 32, a deviation computation unit 33, a PI control unit 34 and a PWM signal generation unit 35. The PWM signal generation unit 35 generates a PWM signal. The control unit 19 further includes a first memory 36 and a second memory 37. The first memory 36 stores a threshold Tsh that is compared with a steering torque T detected by the torque sensor 13. The second memory 37 stores a reaction motor current value I that is obtained from the drive circuit 20B that serves as reaction motor drive current detection means.

The target torque computation unit 31 receives the steering angle θ detected by the steering angle sensor 12 and the vehicle speed V detected by the vehicle speed sensor 15, and computes a target torque T_ref as a function of the steering angle θ and the vehicle speed V. The target torque T_ref increases in a negative direction as the steering angle θ increases in the positive direction, and increases in a positive direction as the steering angle θ increases in the negative direction. In a correlation between the target torque T_ref and the vehicle speed V, the absolute value of the target torque T_ref increases as the vehicle speed V decreases, and the absolute value of the target torque T_ref decreases as the vehicle speed V increases.

The reaction motor current control unit 32 is a section that receives the target torque T_ref and the steering torque T detected by the torque sensor 13 and outputs a target motor current value I_ref. As will be described later in detail, the reaction motor current control unit 32 changes the details of control on a reaction motor current on the basis of the absolute value of the steering torque T. A deviation between the target motor current value I_ref, which is output from the reaction motor current control unit 32, and the reaction motor current value I is computed by the deviation computation unit 33, and the deviation is input into the PI control unit 34. The PI control unit 34 executes PI control for bringing the reaction motor current value I closer to the target motor current value I_ref (that is, bringing the deviation to 0).

The output from the PI control unit 34 is input into the PWM signal generation unit 35. In the PWM signal generation unit 35, the pulse widths of gate signals for executing on/off control on drive elements in the drive circuit 20B are adjusted. The drive circuit 20B generates the reaction motor current value I for driving the reaction motor by utilizing on/off operation of the drive elements. The reaction motor current value I is fed back to the deviation computation unit 33.

Figure 3:
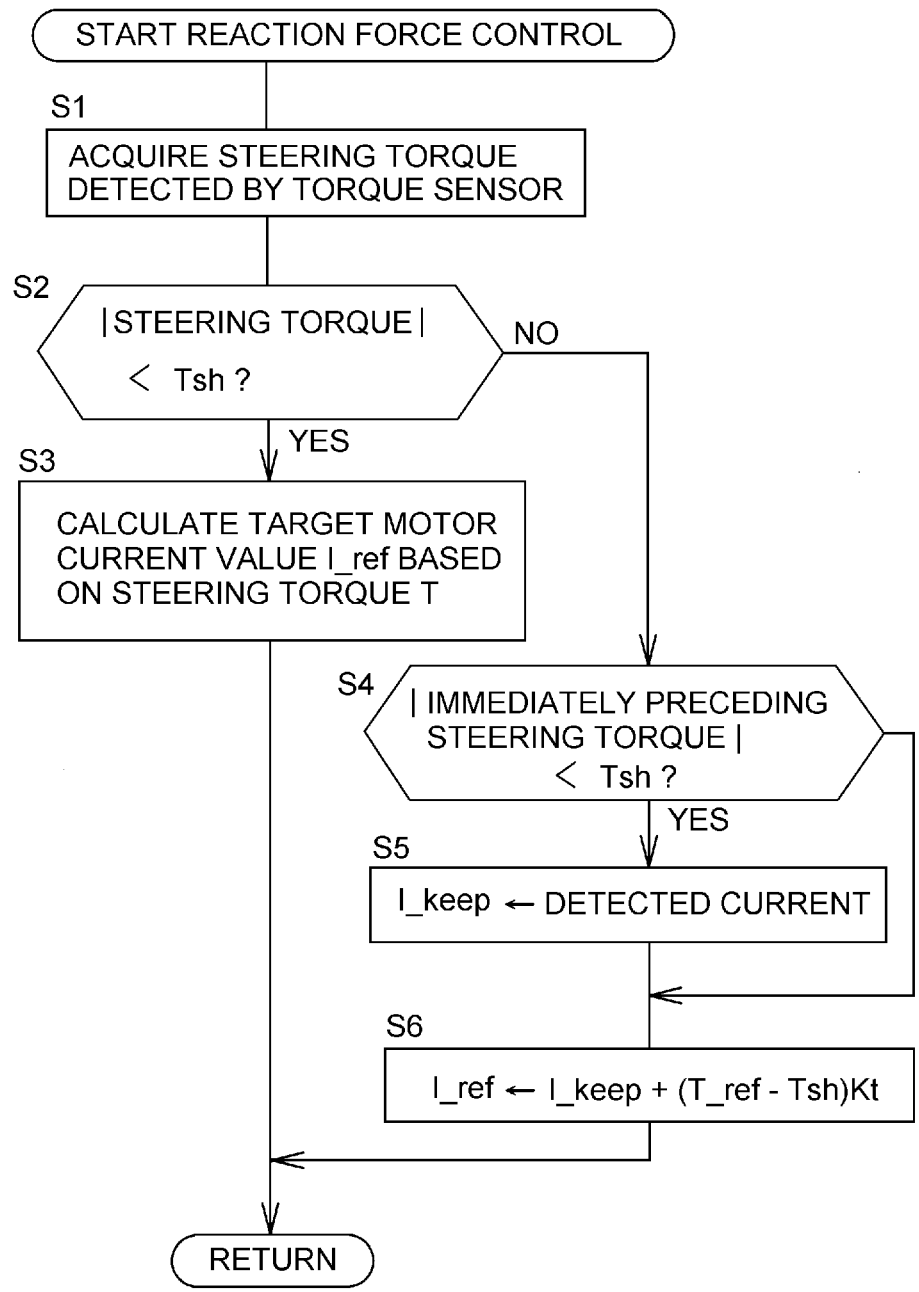
FIG. 3 is a flowchart that illustrates a reaction motor current control process that is executed by the control unit.

The flow of control in the reaction motor current control unit 32 will be described with reference to the flowchart shown in FIG. 3. The control is executed at predetermined processing intervals while the vehicle is travelling. The reaction motor current control unit 32 acquires the steering torque T detected by the torque sensor 13 (step S1), and determines whether the absolute value of the steering torque T is smaller than the threshold Tsh (step S2). The threshold Tsh is set to an upper limit value at or below which the detection accuracy of the torque sensor 13 is ensured, or a value close to the upper limit.

When the absolute value of the steering torque T is smaller than the threshold Tsh (YES in step S2), the target motor current value I_ref is calculated on the basis of the target torque T_ref that is received from the target torque computation unit 31 and the steering torque T detected by the torque sensor 13, according to, for example, Equation 1 for PID control indicated below (step S3).

$$I\_ref = K_P(T\_ref-T) + K_I \int(T\_ref-T)dt + K_D d(T\_ref-T)/dt \qquad \text{Equation 1}$$

Here, $K_P$, $K_I$ and $K_D$ are constants that express the relationship between a motor current and a motor torque. Equation 1 expresses the details of PID control that is executed in order to bring the steering torque T closer to the target torque T_ref.

When the absolute value of the steering torque T is larger than or equal to the threshold Tsh (NO in step S2), a steering reaction force is controlled by utilizing the reaction motor current value I, which is detected from the drive circuit 20B that serves as the reaction motor drive current detection means, together with the target torque T_ref.

The details of the control will be described. The absolute value of the steering torque T detected in the immediately preceding processing cycle is compared with the threshold Tsh (step S4). If the absolute value of the steering torque T is smaller than the threshold Tsh, it is determined that the process currently being executed is the first process after the absolute value of the steering torque T exceeds the threshold Tsh. Therefore, the reaction motor current value I that is obtained from the drive circuit 20B is stored in the second memory 37 (step S5). The stored reaction motor current value I is denoted by I_keep. Then, the target motor current value I_ref is calculated according to Equation 2 indicated below (step S6).

$$I\_ref = I\_keep + (T\_ref - Tsh)Kt \qquad \text{Equation 2}$$

If the absolute value of the steering torque T detected in the immediately preceding processing cycle is larger than or equal to the threshold Tsh (NO in step S4), it is determined that the process currently being executed is not the first process but the second or subsequent process after the absolute value of the steering torque T exceeds the threshold Tsh, and, at this time, the target motor current value I_ref is calculated according to Equation 2 as it is (step S6). According to Equation 2, the target motor current value I_ref is obtained by adding a kept motor current value I_keep immediately after the absolute value of the torque T exceeds the threshold Tsh to the term obtained by multiplying a difference between the target torque T_ref and the threshold Tsh by a motor torque constant in order to convert a torque into a current value.

Due to the configuration of Equation 2, a stepwise change in the target motor current value I_ref at the time when the absolute value of the steering torque T exceeds the threshold Tsh is reduced by addition of the kept motor current value I_keep, and therefore switching control with less torque fluctuations is possible, in comparison with the case where the target motor current value I_ref is determined on the basis of only the term that includes the motor torque constant Kt. As a result, a smooth steering feel is obtained. In a system that is provided with a mechanical friction element in order to further accurately reproduce a characteristic around a neutral state of the vehicle, the mechanical friction element contributes to a favorable reaction force characteristic around the neutral state; whereas a reaction force deviates from a predetermined target reaction force in a region in which the reaction force is large. However, it is possible to compensate for the deviation due to mechanical friction.

As is apparent from a comparison with Equation 1, the threshold Tsh is used instead of the steering torque T that is detected by the torque sensor 13. As described above, because the threshold Tsh is set to the upper limit at or below the detection accuracy of the torque sensor is ensured or a value close to the upper limit, the accuracy of the steering torque T that exceeds the threshold Tsh is not guaranteed. Thus, when the absolute value of the steering torque T is larger than the threshold Tsh, the fixed threshold Tsh is used instead of the steering torque T which is detected by the torque sensor 13 and of which the accuracy is not guaranteed. Thus, even if the torque sensor 13 having wide detection range is not used, it is possible to be cope with a large steering torque while maintaining a high detection resolution.

The embodiment of the invention has been described above. However, the invention is not limited to the above-described embodiment. For example, reaction motor current control that is executed by the vehicle steering control system according to the invention may be applied not only to a steer-by-wire vehicle but also to steering control on a driving simulator. Other than the above, various modifications may be made within the scope of the invention.

What is claimed is:

1. A vehicle steering control system that includes: steering torque detection means for detecting a steering torque that is applied to a steering member; a reaction motor that is used to apply steering reaction force to the steering member; and reaction motor current control means for controlling the steering reaction force, which is applied by the reaction motor, on the basis of the steering torque detected by the steering torque detection means, wherein, reaction motor drive current detection means for detecting a motor drive current that is supplied to the reaction motor, wherein the reaction motor current control means compares an absolute value of the steering torque detected by the steering torque detection means with a predetermined threshold, controls the steering reaction force on the basis of the steering torque when the absolute value of the detected steering torque is smaller than the threshold, and controls the steering reaction force using a motor current value detected by the reaction motor drive current detection means as a reference value when the absolute value of the detected steering torque is larger than or equal to the threshold.

2. The vehicle steering control system according to claim 1, wherein, when the reaction motor current control means makes switchover from control of the steering reaction force based on the steering torque to control of the steering reaction force, which is executed using the motor current value as the reference value, the reaction motor current control means stores a motor current value at the time of the switchover, and controls the steering reaction force using the stored motor current value as the reference value.

3. The vehicle steering control system according to claim 1, wherein the vehicle steering control system is a vehicle steering control system that is equipped with a steer-by-wire system.

* * * * *